3,265,763
MAR-RESISTANT UNSATURATED POLYESTER RESINS

William George Deichert, Flushing, N.Y., and Irene Christensen, Stamford, Conn., assignors to American Cyanamid Company, Stamford, Conn., a corporation of Maine
No Drawing. Filed Aug. 17, 1964, Ser. No. 390,197
17 Claims. (Cl. 260—872)

This invention relates to a substantially linear, water-insoluble, non-gelled, unsaturated polyester resin composition consisting essentially of the blend of (1) the esterification reaction product of fumaric acid and certain polyethylene glycols, (2) certain glycol diacrylates and (3) comparatively small amounts of a polymerizable styrene. Still further, this invention relates to a hard, mar-resistant, cross-linked, unsaturated polyester resin prepared from the composition set forth hereinabove. Still further, this invention relates to articles of manufacture comprising a substrate coated with the unsaturated polyester resin composition set forth hereinabove, converted to a hard, mar-resistant, cross-linked state. Still further the present invention relates to optical articles such as windowpanes and lenses that are coated with the unsaturated polyester resin composition of the present invention wherein said coating has been converted to a hard, mar-resistant, cross-linked state.

One of the objects of the present invention is to produce a substantially linear, water-insoluble, non-gelled, unsaturated, polyester resin composition consisting essentially of a blend of (1) the esterification reaction product of fumaric acid and certain polyethylene glycols, (2) certain glycol diacrylates and (3) comparatively small quantities of a polymerizable styrene. A further object of the present invention is to produce a hard, mar-resistant, cross-linked polyester resin product from the aforementioned polyester resin composition by converting it to the thermoset state. A further object of the present invention is to produce articles of manufacture comprising a base member coated with the polyester resin of the present invention and then converted to a hard, mar-resistant, cross-linked thermoset polyester resin. These and other objects of the present invention will be discussed in greater detail hereinbelow.

Reference is made to the copending application Serial No. 307,812, filed September 10, 1963, in the names of Deichert and Webb. In the aforesaid application, there is set forth a disclosure of the substantially linear, water-insoluble, non-gelled, unsaturated polyester resin composition comprising the components 1 and 2 as set forth hereinabove. The earlier polyester resin compositions impart to substrates to which they are applied markedly improved mar-resistant properties in those instances when the substrate has a deficiency in mar-resistance. When the substrate to which the coating is applied is not transparent but only translucent or even opaque, these coatings accomplish substantially all of the improvements desired. Even when applied to certain transparent substrates, in many instances the resulting coated substrate is a clear mar-resistant product having substantially all of the desired properties. It has been found, however, that in certain instances the coating of certain transparent substrates, that upon the curing of the polyester resin to the hard, mar-resistant, thermoset state that a slight haze tends to develop. This haziness is undesirable particularly if the ultimate product is to be used as window glass or as an optical lens such as those used in eyeglasses, telescopes, binoculars, microscopes and the like. We have discovered that by modifying the compositions of the aforementioned pending application with small quantities of a polymerizable styrene, that the ultimate coated transparent article is crystal clear and displays no evidence of haziness. The amount of the polymerizable styrene that is used in the formulation of the present invention may be varied between about 1% and 5% by weight based on the total weight of the fumaric acid polyester, the glycol diacrylate and the polymerizable styrene. Insignificant amounts of other reactants which have no serious detrimental effect on the properties of the ultimate product produced are also within the contemplations of the present invention.

The first component of the present invention is the esterification reaction product produced by reacting components consisting essentially of fumaric acid and a polyglycol wherein said glycol contains between 6 and 26 carbon atoms. The esterification reaction between the fumaric acid and the polyethylene glycol is carried out until an acid number below about 30 is reached.

Among the polyethylene glycols which may be used to esterify the fumaric acid are triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol and tridecaethylene glycol. These polyethylene glycols may be used either singly or in combination with one another. In the practice of the process of the present invention relating to the preparation of this polyester resin composition, the fumaric acid and the polyethylene glycol will be used in substantially equimolar proportions, since each is, for the purposes of esterification, difunctional. For preferred processing results, a slight excess amounting to about 5 to 20% of the polyethylene glycol should be used over and beyond the amount stoichiometrically calculated to esterify substantially all of the carboxyl groups in the fumaric acid.

The second component of the present invention namely, the glycol diacrylates, are prepared by esterifying an alpha, beta, ethylenically unsaturated monocarboxylic acid selected from the group consisting of acrylic acid and methacrylic acid with a glycol selected from the group consisting of polyglycols having from 4 to 8 carbon atoms and monoglycols containing from 2 to 4 carbon atoms. Among the polyglycols which may be used to produce the glycol diacrylates are diethylene glycol, triethylene glycol, tetraethylene glycol, dipropylene glycol, bis(4-hydroxybutyl)ether. Among the monoglycols which may be used to esterify the acrylic acids are ethylene glycol, propyleneglycol, and the propanediols-1,2 and 1,3 and the butanediols-1,2; 1,3; and 1,4. These glycol diacrylates can be used with the glycol fumarates either singly or in combination with one another. However, whether used singly or in combination, the glycol diacrylate should be present in the total composition in an amount varying between about 10% and 40% by weight based on the total weight of said glycol fumarate and said glycol diacrylate.

As has been indicated hereinabove, the third component in the composition of the present invention is a polymerizable styrene and is present in amounts varying between 1% and 5% by weight based on the total weight of the first, second and third components. Preferably, one would use about 3% by weight of said styrene, same basis. Among the polymerizable styrenes which may be used in the composition of the present invention are styrene per se, side chain and ring substituted halo and/or alkyl styrenes such as α-chlorostyrene, α-methylstyrene, o-, m-, p-methyl styrene, o-, m-, p-chlorostyrenes, 2,4-dimethylstyrene, 2,5-dimethylstyrene, 2,3-dichlorostyrene, 2,4-dibromostyrene, and the like. Since the presence of a halo substituent on a styrene compound may have a tendency to impart a slight yellowness to the ultimate cured object, these halo-substituted styrenes should be avoided particularly when the ultimately produced object will be used in an area where clarity and water whiteness is desired.

It has been pointed out hereinabove that the substantially linear, water-insoluble, non-gelled unsaturated polyester resin composition of the present invention can be converted to a hard mar-resistant product. This conversion from the ungelled or thermosetting state to the hard thermoset state can be accomplished by the application of heat and/or pressure with or without catalysis. Still further the thermosetting material can be converted to the thermoset state by use of catalysts or initiators only without resorting to either heat or pressure. The catalytic materials or polymerization initiators which would be used to make such a conversion in state are well known in the art and have been used extensively for this purpose. Illustrative catalysts are the peroxide catalysts such as, benzoyl peroxide, tertiary butyl hydroperoxide, ditertiary butyl peroxide, and cumene hydroperoxide, among many others. The ketone peroxides may also be used such as, the methyl ethyl ketone peroxide, the diethylketone peroxide and the like. The amounts of the catalytic material used will be conventional such as between about 0.01% and 3% by weight based on the weight of the polymerizable composition.

The polymerizable polyester resin compositions of the present invention will have utility in many areas such as in coatings, moldings, castings, and the like. One of the principal end uses for the polymerizable polyester resin compositions of the present invention is in the areas of coating substrates that have a transparent characteristic in order to impart to said substrate a hard, mar-resistant surface. More particularly, the polymerizable polyester resin compositions of the present invention can be used to coat glass for window purposes or for television implosion shields, and the like. Additionally, one can use the polymerizable compositions of the present invention to coat lenses as in eye glasses, including sunglasses, binoculars and telescopes and the like. Still further, these polymerizable compositions may be used to coat sheets of synthetic plastic materials such as sheets of polystyrene, polymethyl methacrylate, polycarbonates and the like. Still further, these polyester resin compositions can be used alone as a molding or casting composition to make such articles as eyeglass lenses and the like. If desired, the polyester resin compositions of the present invention may have incorporated therein, ultraviolet light absorbers of which a substantial plurality are well known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic materials may be incorporated into the polymerizable resin of the present invention thereby permitting changes from a colored glass to a clear glass and vice versa, due to the absence or presence of light, including sunlight. If a permanent coloration is desired in the polymerizable polyester resins of the present invention, that will not defeat the principal desired end use namely, transparency, certain dyes and/or pigments may be dissolved in the unsaturated polymerizable polyester resin in order to achieve a tinting. Furthermore, the polyester resin compositions of the present invention can be rendered translucent or even opaque by use of the appropriate selection of filler and/or pigment in the desired kind and amount especially when being used as a coating for substrates such as wood, metal and opaque filled plastic articles.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with thermometer, stirrer, inert gas inlet and outlet tubes, there is introduced 126 parts of triethyleneglycol and 93 parts of fumaric acid. The charge is heated at about 150–200° C. for a 24-hour period while bubbling carbon dioxide gas through the reaction mixture so as to provide an inert atmosphere blanket. At the end of the reaction period, the product, having an acid number of 17, is a light yellow viscous liquid. Nine parts of the polyester resin thus produced are blended with one part of ethylene glycol dimethacrylate, 0.3 part of monomeric styrene and 0.1 part of benzoyl peroxide. This solution is poured onto a sheet of glass to form a film onto which film is placed a sheet of polymethyl methacrylate. The sheet is placed carefully over the resin solution so as to avoid getting bubbles between the plastic sheet and the glass. thereafter, a second sheet of glass is placed over the plastic sheet and the total assembly is clamped together so as to squeeze out excess resin and assure that there would be no warping or other distortion during the curing of the resin. The assembly is then heated for one hour at 80° C. followed by 3 hours at 110° C. After cooling to room temperature, the clamps are removed and the glass sheets separated from the plastic sheet. The coated sheet, after the flash removal, had a haze value of 0.3%. A substantially identical plastic sheet made in substantially the same manner and with the same ingredients except for the absence of the styrene monomer, had a haze value of 1.5% although to the naked eye each of the two plastic sheets looked comparable.

*Example 2*

Example 1 is repeated in substantially all details except that in the place of the triethylene glycol there was substituted an equivalent amount of a polyethylene glycol having a molecular weight of about 400. Additionally, a modification was made by adding 2% of monomeric styrene instead of the 3% as in Example 1. The properties of the ultimate treated sheet were substantially the same as those of Example 1, except that the haze value was 0.9%. A comparable sheet made exactly according to the present invention but without any styrene had a haze value of 2%.

*Example 3*

Into a suitable reaction vessel equipped as in Example 1, there is introduced 120 parts of triethylene glycol and 76 parts of maleic anhydride. The charge is heated to 210° C. for about 10 hours until the maleic acid is completely isomerized to fumaric acid as determined by infrared. A solution of 80 parts of this polyester resin, 20 parts of tetraethylene glycol dimethacrylate and 5 parts of styrene catalyzed with 1% of benzoyl peroxide, were coated onto a sheet of polymethyl methacrylate using the same procedure and technique as in Example 1. After the removal of the glass plates, the plastic sheet is clear, very slightly yellow, haze free and had an excellent optical appearance over a wide temperature range, namely —40° C. to 120° C. The sheet had a Barcol hardness of 42 and a mar value of 1. A comparable sheet prepared precisely according to the present example but containing no monomeric styrene had a barely detectable haze at 24° C. but when subjected to temperatures of 60° C., the sheet became objectionably hazy.

The haze test referred to hereinabove is carried out according to the procedure of A.S.T.M. D 1003.

We claim:

1. A substantially linear, water-insoluble, non-gelled unsaturated polyester resin composition consisting essentially of a blend of (1) the esterification reaction product of reactants consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

2. A substantially linear, water-insoluble, non-gelled unsaturated polyester resin composition consisting essentially of a blend of (1) the esterification reaction product of reactants consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) styrene in an amount varying between about 1% and 5% by weight based on the total weight of (1), (2) and (3).

3. A substantially linear, water-insoluble, non-gelled unsaturated polyester resin composition consisting essentially of a blend of (1) the esterification reaction product of reactants consisting essentially of fumaric acid and triethylene glycol, wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

4. A substantially linear, water-insoluble, non-gelled unsaturated polyester resin composition consisting essentially of a blend of (1) the esterification reaction product of reactants consisting essentially of fumaric acid and triethylene glycol, wherein said product has an acid number below about 30, (2) ethylene glycol dimethacrylate, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

5. A substantially linear, water-insoluble, non-gelled unsaturated polyester resin composition consisting essentially of a blend of (1) the esterification reaction product of reactants consisting essentially of fumaric acid and triethylene glycol, wherein said product has an acid number below about 30, (2) ethylene glycol dimethacrylate, wherein (2) is present in an amount varying between about 10% and 40% by weight based on the total weight of (1) and (2), and (3) styrene in an amount varying between about 1% and 5% by weight based on the total weight of (1), (2) and (3).

6. A hard, mar-resistant, cross-linked unsaturated polyester resin composition consisting essentially of the cured reaction product of (1) the esterification reaction product of reactants consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

7. A hard, mar-resistant, cross-linked unsaturated polyester resin composition consisting essentially of the cured reaction product of (1) the esterification reaction product of reactants consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) styrene in an amount varying between about 1% and 5% by weight based on the total weight of (1), (2) and (3).

8. A hard, mar-resistant, cross-linked unsaturated polyester resin composition consisting essentially of the cured reaction product of (1) the esterification reaction product of reactants consisting essentially of fumeric acid and triethylene glycol, wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

9. A hard, mar-resistant, cross-linked unsaturated polyester resin composition consisting essentially of (1) the esterification reaction product of reactants consisting essentially of fumaric acid and triethylene glycol, wherein said product has an acid number below about 30, (2) ethylene glycol dimethacrylate, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

10. A hard, mar-resistant, cross-linked unsaturated polyester resin composition consisting essentially of the cured reaction product of (1) the esterification reaction product of reactants consisting essentially of fumaric acid and triethylene glycol, wherein said product has an acid number below about 30, (2) ethylene glycol dimethacrylate wherein (2) is present in an amount varying between about 10% and 40% by weight based on the total weight of (1) and (2), and (3) styrene in an amount varying between about 1% and 5% by weight based on the total weight of (1), (2) and (3).

11. A sheet of polymethyl methacrylate having bonded to the surface thereof a hard, mar-resistant cross-linked unsaturated polyester resin composition consisting essentially of the cured reaction product of (1) the esterification reaction product of reactants consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

12. A sheet of polymethyl methacrylate having bonded to the surface thereof a hard, mar-resistant cross-linked unsaturated polyester resin composition consisting essentially of the cured reaction product of (1) the esterification reaction product of reactants consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) styrene in an amount varying between about 1% and 5% by weight based on the total weight of (1), (2) and (3).

13. A sheet of polymethyl methacrylate having bonded to the surface thereof a hard, mar-resistant cross-linked unsaturated polyester resin composition consisting essentially of the cured reaction product of (1) the esterification reaction product of reactants consisting essentially of fumaric acid and triethylene glycol, wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

14. A sheet of polymethyl methacrylate having bonded to the surface thereof a hard, mar-resistant cross-linked unsaturated polyester resin composition consisting essentially of the cured reaction product of (1) the esterification reaction product of reactants consisting essentially of fumaric acid and a polyethylene glycol, wherein said glycol has between 6 and 26 carbon atoms and wherein said product has an acid number below about 30, (2) ethylene glycol dimethacrylate, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

15. A sheet of polymethyl methacrylate having bonded to the surface thereof a hard, mar-resistant cross-linked unsaturated polyester resin composition consisting essentially of the cured reaction product of (1) the esterification reaction product of reactants consisting essentially of fumaric acid and a polyethylene glycol, wherein said glycol has between 6 and 26 carbon atoms and wherein said product has an acid number below about 30, (2) ethylene glycol dimethacrylate wherein (2) is present in an amount varying between about 10% and 40% by weight based on the total weight of (1) and (2), and (3) styrene in an amount varying between about 1% and 5% by weight based on the total weight of (1), (2) and (3).

16. An optical lens comprising a transparent base of polymethyl methacrylate having bonded to at least one surface thereof a hard, mar-resistant cross-linked unsaturated polyester resin composition consisting essentially of the cured reaction product of (1) the esterification reaction product of reactants consisting essentially of fumaric acid and a polyethylene glycol wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) a polymerizable styrene in an amount varying between about 1% and 5% by weight based on the total weight of (1), (2) and (3).

17. An optical lens comprising a transparent base of polymethyl methacrylate having bonded to at least one surface thereof a hard, mar-resistant cross-linked unsaturated polyester resin composition consisting essentially of the cured reaction product of (1) the esterification reaction product of reactants consisting essentially of fumaric acid and a polyethylene glycol, wherein said glycol has between 6 and 26 carbon atoms and wherein said product has an acid number below about 30, (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40% by weight based on the total weight of (1) and (2), and (3) styrene in an amount varying between about 1% and 5% by weight based on the total weight of (1), (2) and (3).

References Cited by the Examiner
UNITED STATES PATENTS 2,645,626 7/1953 Nordlander et al. ____ 260—866
3,222,421 12/1965 Lundberg _____ 260—872

MURRAY TILLMAN, Primary Examiner.

J. T. GOOLKASIAN, Assistant Examiner.